Figure 14:
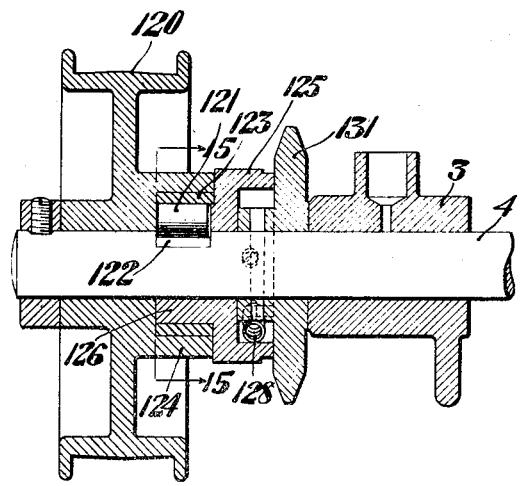

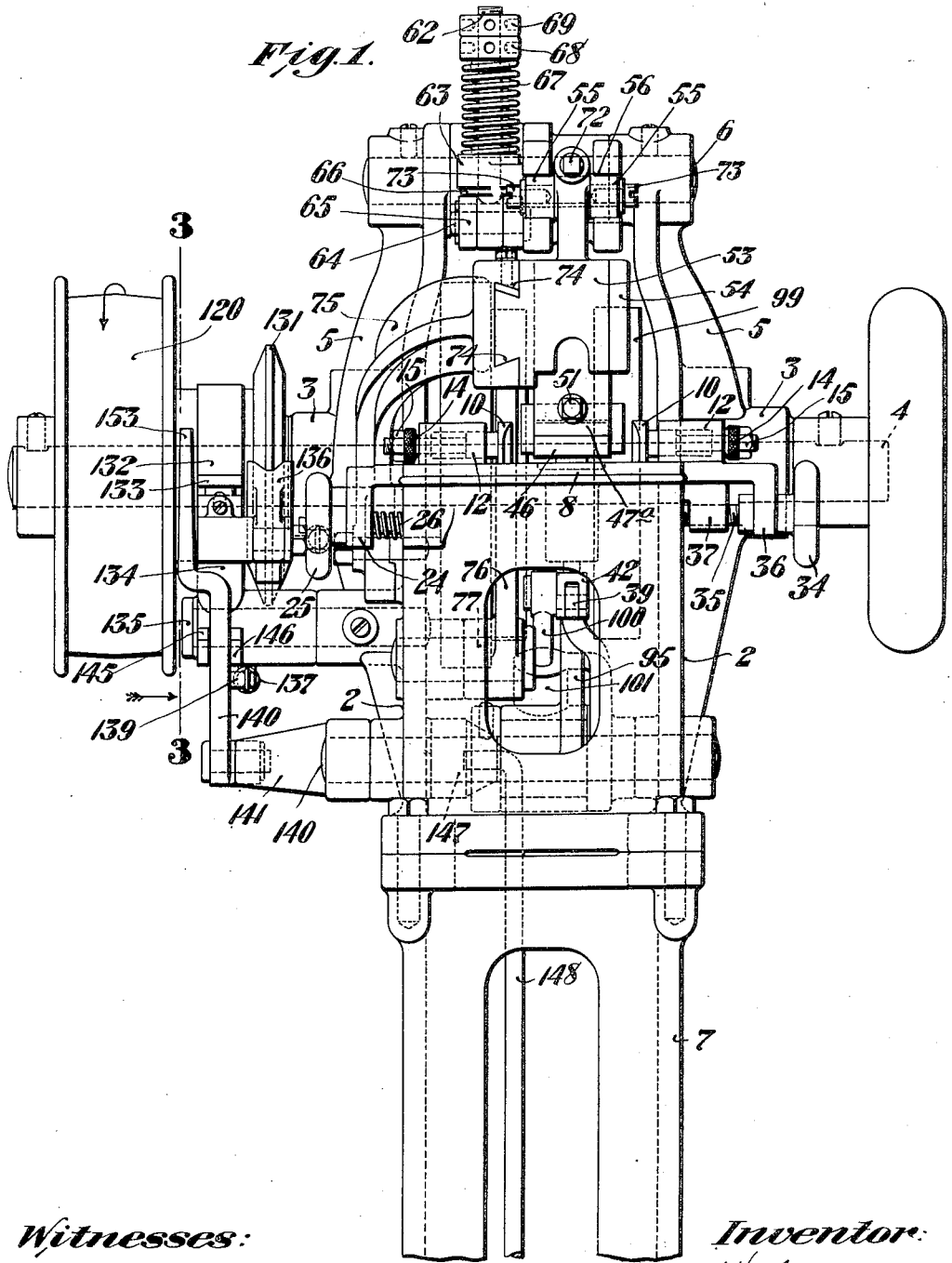

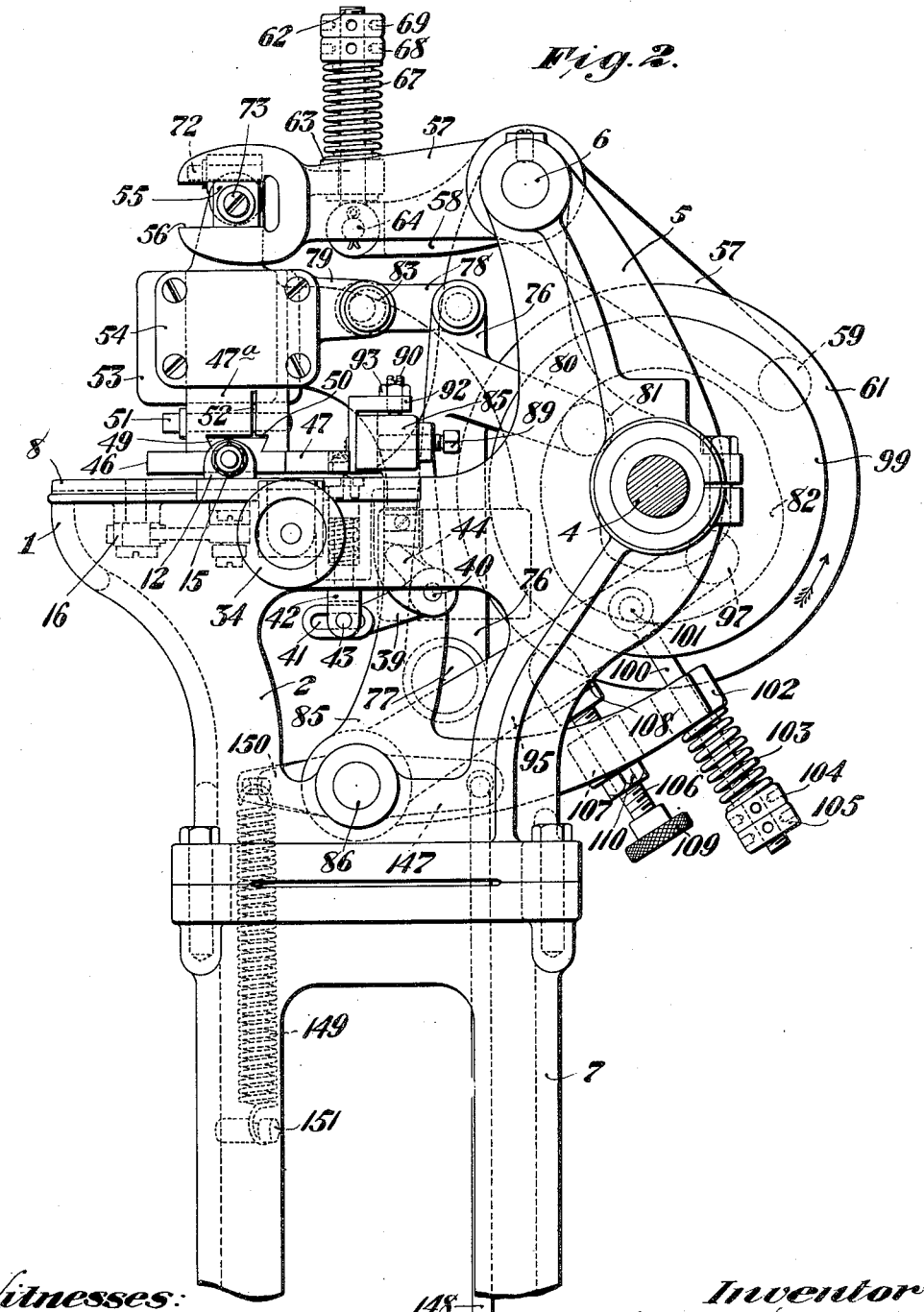

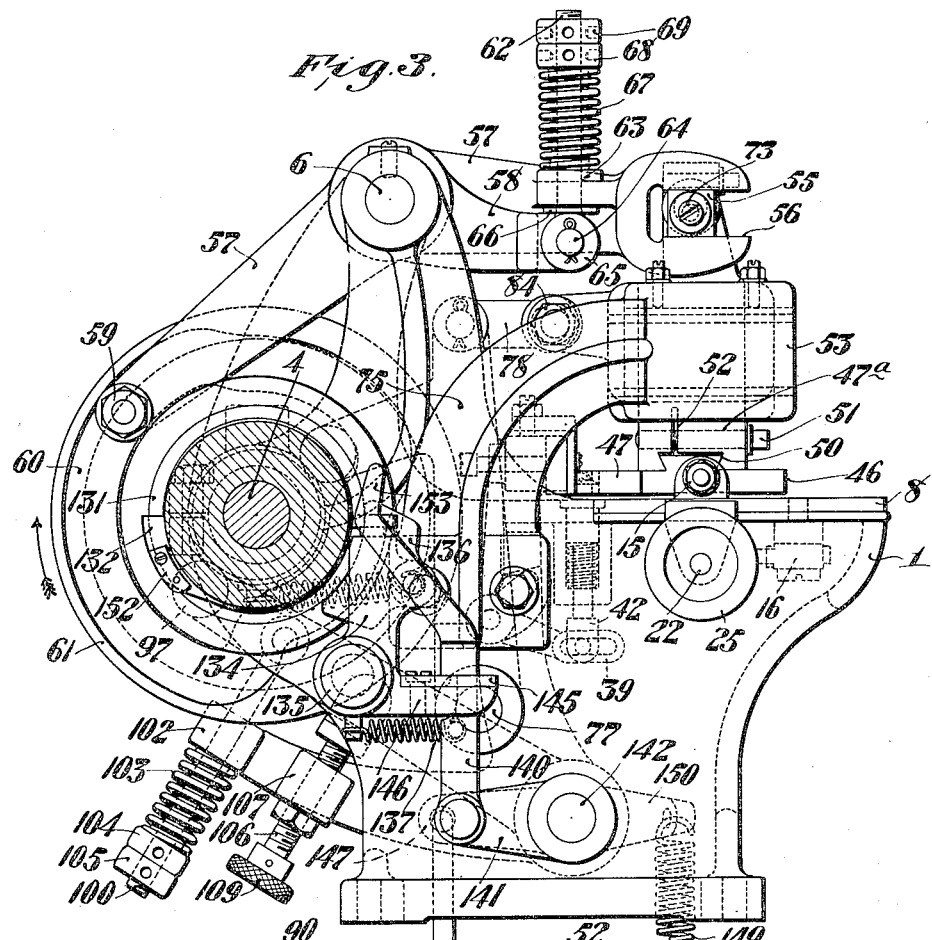

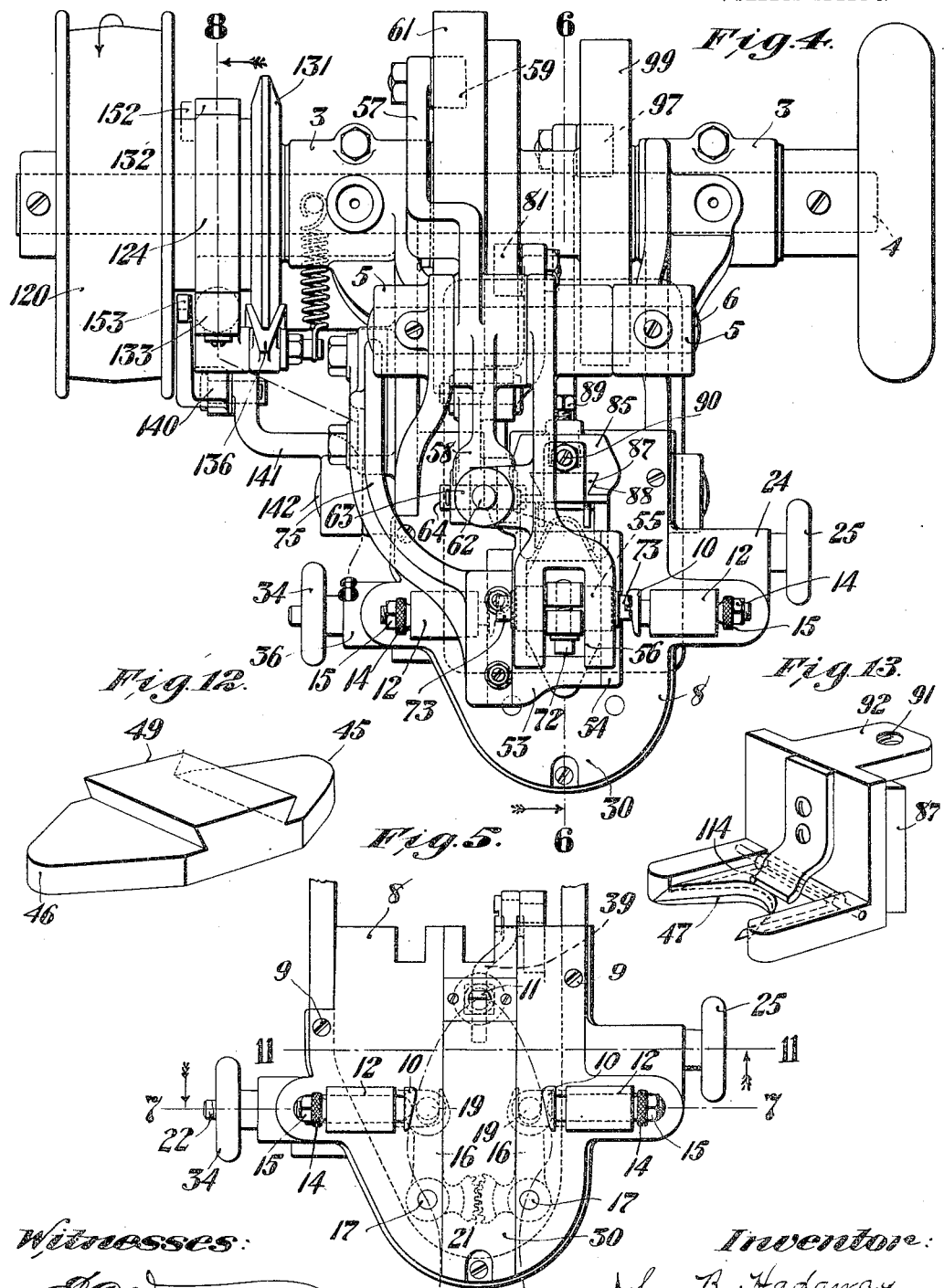

J. B. HADAWAY.
MACHINE FOR OPERATING UPON INSOLES.
APPLICATION FILED JULY 15, 1910.
1,126,990. Patented Feb. 2, 1915.
7 SHEETS—SHEET 5.
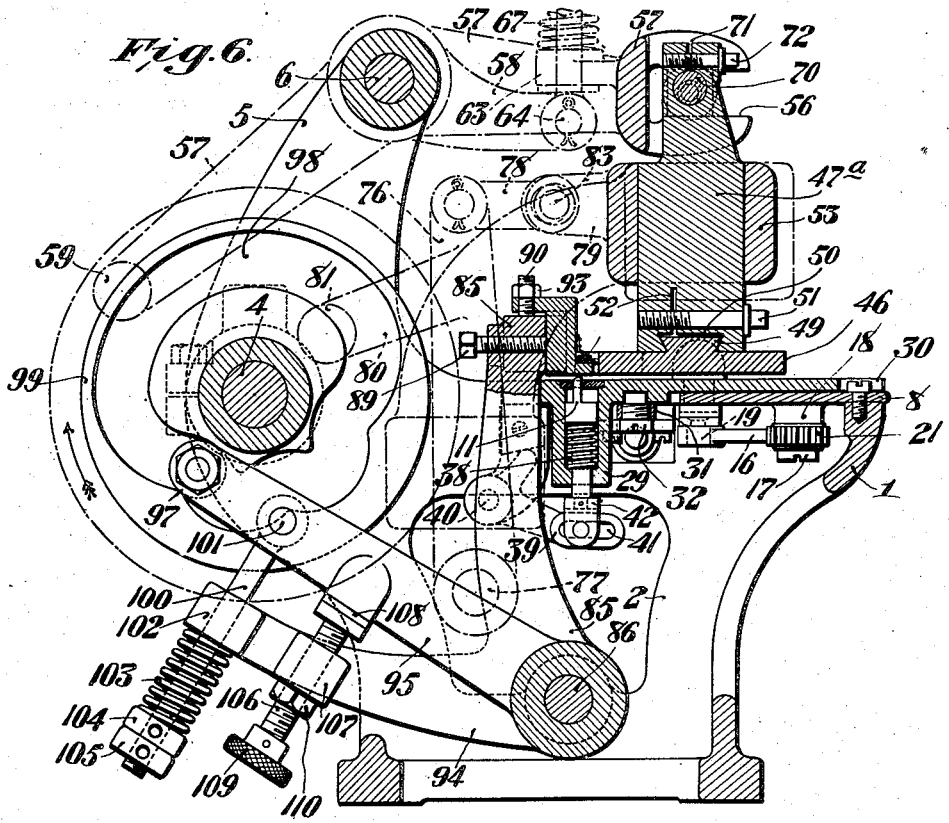
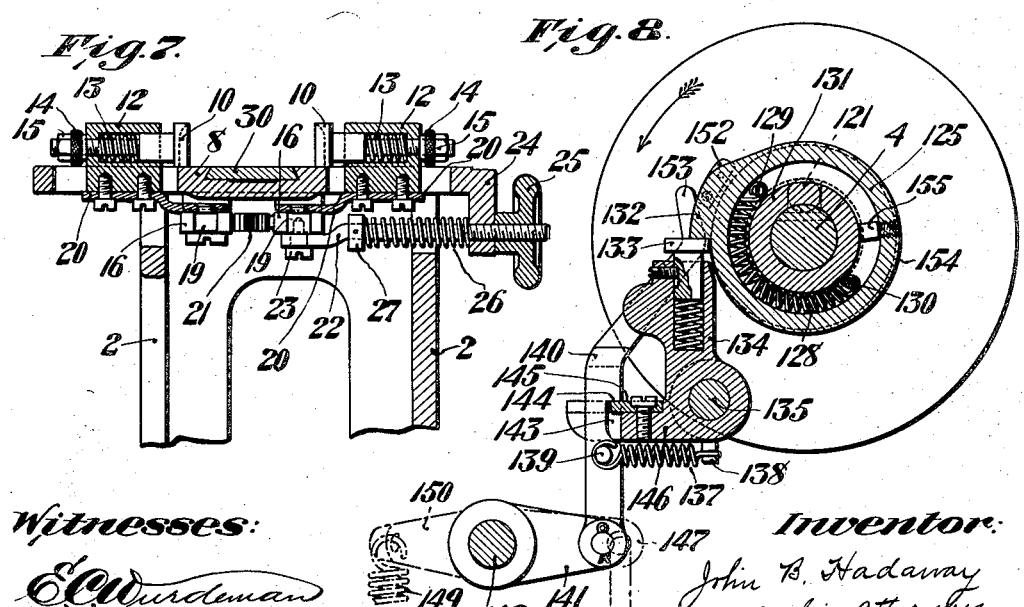
Witnesses:
Inventor:
John B. Hadaway

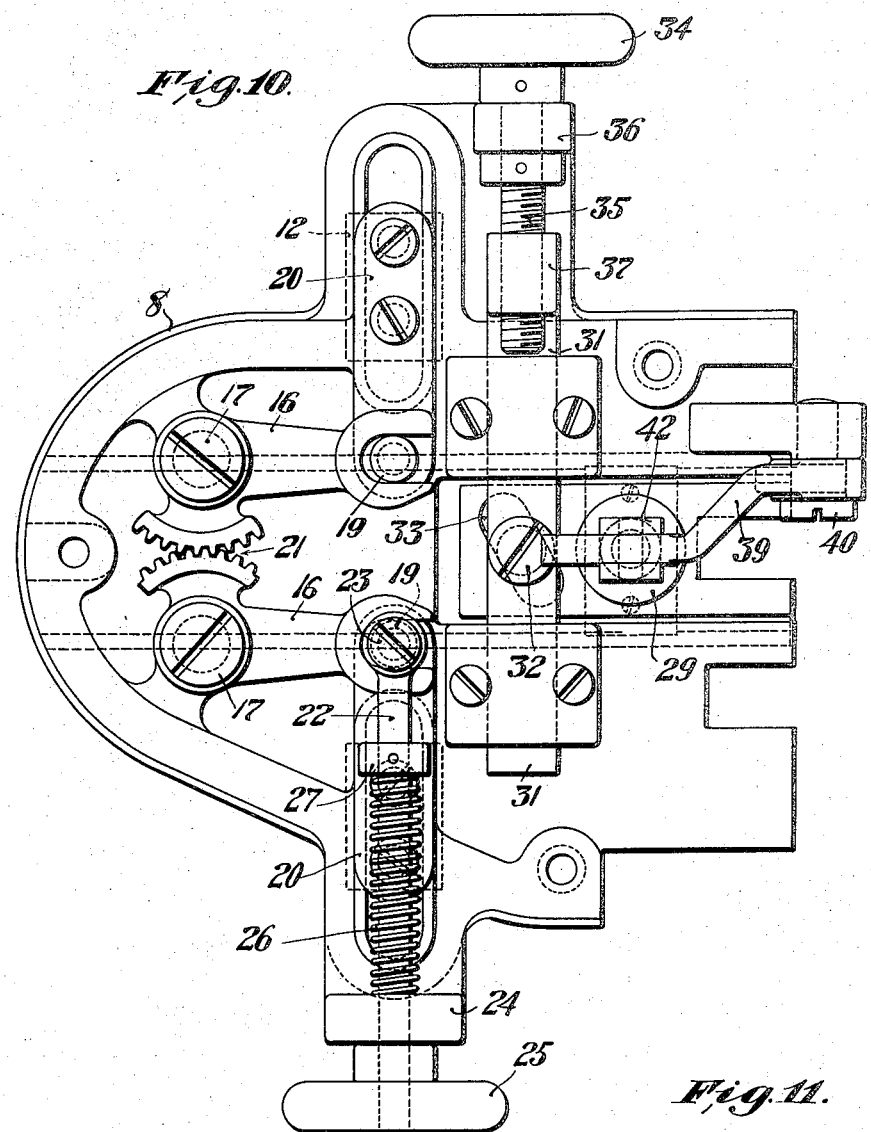
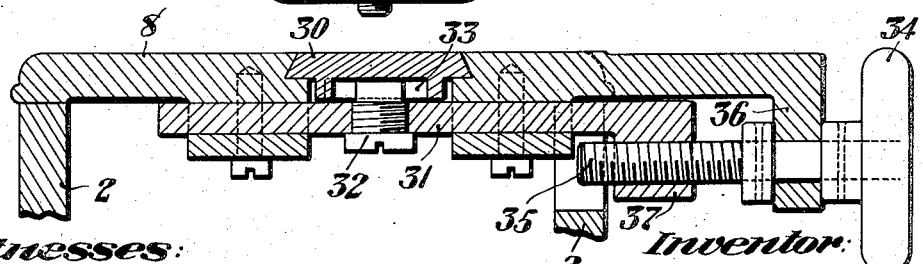

J. B. HADAWAY.
MACHINE FOR OPERATING UPON INSOLES.
APPLICATION FILED JULY 15, 1910.

1,126,990.

Patented Feb. 2, 1915.
7 SHEETS—SHEET 7.

UNITED STATES PATENT OFFICE.

JOHN B. HADAWAY, OF DUXBURY, MASSACHUSETTS, ASSIGNOR TO UNITED SHOE MACHINERY COMPANY, OF PATERSON, NEW JERSEY, A CORPORATION OF NEW JERSEY.

MACHINE FOR OPERATING UPON INSOLES.

1,126,990.　　　　Specification of Letters Patent.　　Patented Feb. 2, 1915.

Application filed July 15, 1910. Serial No. 572,102.

*To all whom it may concern:*

Be it known that I, JOHN B. HADAWAY, a citizen of the United States, residing at Duxbury, in the county of Plymouth and State of Massachusetts, have invented certain new and useful Improvements in Machines for Operating Upon Insoles; and I do hereby declare the following to be a full, clear, and exact description of the invention, such as will enable others skilled in the art to which it appertains to make and use the same.

The present invention relates to machines for operating upon insoles during their process of manufacture, and more particularly to machines for setting and shaping the lip of an insole.

Insoles as at present constructed are commonly provided with a rib or "lip", as it is called, to receive the line of stitches by which it is subsequently united to the other portions of the shoe. In some types of insole the lip is formed of one or more portions of the insole itself, first partially separated from the body of the insole by a cut slit in or adjacent to the edge thereof, and then turned up at an angle thereto. In other types the lip consists of a separate piece or pieces of any suitable material bent or folded to the desired shape and secured to the body of the insole. In all those insoles, however in which the formation of the lip involves a bending operation, whether such lip be integral with or separate from the insole proper, more or less difficulty has been experienced in causing the lip to assume and retain its proper angular position relative to the body of the insole, the curving outline of the lip, which generally is substantially parallel to the edge of the insole, producing at the top edge of the lip either a scarcity or an excess of material, with a consequent tendency on the part of the lip to resume its original position. It has been sought to overcome such tendency and to insure the retaining of the lip in proper angular position by subjecting the insole to the operation of a lip setting machine, so called, which, generally speaking, acted successively upon very short sections of the lip and at or close to the angle or line of jointure with the body of the sole to bend the lip sharply and to such excess that when relieved the lip would return only to the desired position. With some insoles it has been further considered necessary or desirable, in order that the latter may be properly turned and set, to provide a series of transverse cuts or slashes extending partially through the lip. These operations, while more or less effective in retaining the lip in the desired position at those portions of the insole where the curvature is slight, fail to set the lip properly where the curvature is sharp, as around the toe. Moreover, the strains due to excessive bending and the severing of the material by the transverse slashes necessarily weaken the lip and render it less able to withstand the heavy strains to which it is subsequently subjected.

One of the principal objects of the present invention is to provide a machine which may effectively set all portions of the lip of an insole and particularly the toe portion, however narrow and pointed it may be.

Another difficulty that has been experienced with lipped insoles of the above described types has been the variation in the shape or contour of the lip relatively to the outline of the insole, such variation being generally due to imperfect operation of the lip forming and setting machines or to lack of skill on the part of their operators.

The present invention seeks as another of its objects to remedy this defect by providing a machine which shall operate to shape the lip or any desired portion thereof invariably into the proper outline or contour.

Another object of the present invention is to produce a machine for cutting or trimming away the surplus or excess material at the top of the lip so that the lip, particularly at the toe portion of the insole, shall be of the proper height, the trimming mechanism preferably being combined with mechanism for performing other operations upon the insole, such as the lip setting or the lip shaping operations above referred to.

Other objects and features of the present invention will be hereinafter referred to in connection with the following detailed description of the specific form of machine illustrated in the accompanying drawings.

While this machine is designed especially for use upon the toe portion of pointed or narrow toed insoles which have already been operated upon by the ordinary or common type of lip turning and setting machines above referred to, it will be obvious to those skilled in the art that the main or essential features of construction and operation, as well as many of the details thereof, may be embodied in other mechanisms and machines designed to operate upon other, or, if preferred, upon all portions of the lip of various types and styles of insoles, and to perform the complete operations of setting, shaping, and trimming the lip, or of any one or more of such operations.

Figure 15:
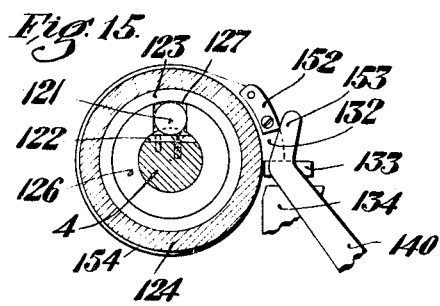

In the accompanying drawings which illustrate what is now considered the preferred embodiment of the present invention, Figure 1 is a front elevation of my machine for operating upon insoles; Fig. 2 is a side elevation, looking from the right in Fig. 1, with the hand wheel removed and the main shaft shown in section; Fig. 3 is a side view, principally in elevation, looking from the left in Fig. 1 on line 3—3; Fig. 4 is a top plan view of the machine; Fig. 5 is a top plan view of the work support showing in dotted outline the position of an insole thereon; Fig. 6 is a transverse vertical section on line 6—6 Fig. 4, looking toward the right; Fig. 7 is a vertical sectional view of the work support on line 7—7, Fig. 5, looking from the back toward the front; Fig. 8 is a transverse vertical sectional view of the clutch mechanism on line 8—8, Fig. 4, looking toward the left; Fig. 9 is an enlarged vertical sectional view of a portion of the work support, also showing an insole and the working instrumentalities for operating thereon; Fig. 10 is an enlarged bottom plan view of the work support; Fig. 11 is an enlarged vertical sectional view of the same on line 11—11, Fig. 5, looking from the front toward the back; Figs. 12 and 13 show in perspective the coöperating forms for operating upon the lip of the insole; Fig. 14 is a vertical, longitudinal, sectional view of the clutch mechanism; and Fig. 15 is a vertical, transverse, sectional view of the same mechanism on line 15—15, Fig. 14, looking toward the right.

As appears from Figs. 1, 2, 3, 4 and 6 of the drawings, the frame of the machine comprises a single casting having the overhanging front portion 1 and the sides 2 which are extended rearwardly, carrying the bearings 3 for the main shaft 4, and upwardly to form the supports 5 in which is fixedly secured the stud 6 upon which certain of the actuating levers are pivoted as will be hereinafter described. The machine proper is mounted upon a column 7 to bring the working parts at a convenient height for the operator.

The insole is supported while being operated upon by means of a work table or support 8 extending across the top of the front portion of the frame and secured thereto by the screws 9. The insole is positioned upon the work support by the two side gages 10 which engage opposite edges of the insole to locate it laterally, and a toe gage 11 to locate it longitudinally. The side gages 10 are yieldingly mounted in the gage blocks 12 projecting through elongated slots in the work support, springs 13 normally pressing the gages toward each other. The tension of the springs and the extent of yielding movement of the gages may be regulated by the thumb screw 14 and check nut 15 on the threaded end of the shank or stem of the gage.

While the yielding mounting of the gages will provide for small variations in widths of insole, it is desirable that the gages be further adjustable to adapt the machine for extremely narrow as well as for excessively wide insoles, and in order that the insole may be properly "centered" irrespective of its width, a common means of adjustment is provided which will move both gages equal distances toward or from each other. These means are shown in Figs. 5, 7 and 10, and include the bell crank levers 16 pivoted upon studs 17 secured in bosses 18 projecting downwardly from the bottom of the work support. The longer arm of these bell crank levers is slotted at its extremity and straddles the stud 19 projecting downwardly from the inner end of the plate 20 secured to the bottom of the gage block 12. The shorter arm of each bell crank lever is segmental in shape and provided with gear teeth 21 which intermesh so that movement of one bell crank lever is necessarily accompanied by a similar movement of the other. The means for actuating the bell crank levers to adjust the gages comprise the rod 22, one end of which is pivotally connected to one of the studs 19 by the small stud 23, while the other end, which is threaded, passes freely through the hole in the arm or bracket 24 extending outwardly and downwardly from the side 2 of the main frame. An adjusting hand wheel 25 with an internally threaded hole is mounted upon the end of the rod 22 and is normally held in close engagement with the arm 24 by means of the spring 26 surrounding the rod 22, one end engaging the inner side of the arm 24 and the other a collar 27 pinned upon the rod. It is evident that by turning the hand wheel 25 the gages may be adjusted nearer to or farther from each other, as the operator may desire, each gage being moved the same distance so that the insole, irrespective of its width, will always be properly "centered" upon the work support.

The toe gage 11 for positioning the insole longitudinally (see Figs. 6 and 9), is mounted to be vertically movable in a socket or recess 28 in the boss 29, downwardly projecting from the slide 30 carried by work support 8. This slide is longitudinally movable in the work support to adjust the toe gage toward or from the front of the machine for varying widths of feather of the insole by means of the transverse slide 31 (see Figs. 10 and 11), carrying the stud 32, the upper end of which enters the oblique slot 33 formed in the gage-carrying slide 30. The transverse slide 31 is actuated by the hand wheel 34 pinned upon the short shaft 35 mounted to turn in the arm or bracket 36 extending laterally and downwardly from the left-hand side 2 of the frame of the machine, the inner end of the shaft 35 being threaded and entering a correspondingly threaded aperture in the depending end 37 of the transverse slide. By turning the hand wheel 34 the toe gage may be adjusted to the desired position.

The toe gage is normally pressed upwardly by the spring 38 but is arranged to be depressed at certain times in the operation of the machine by means of the bell crank lever 39 pivoted upon the stud 40 secured in the fixed portion of the machine. The longer arm of this lever is slotted as shown at 41 and is straddled by the bifurcated lower end 42 of the toe gage 11, the pin 43 secured in such bifurcated end passing through the slot 41. It is evident that when the shorter arm 44 of the bell crank lever 39 is moved to the right in Fig. 9, the toe gage will be depressed, the pin-and-slot connection between the bell crank lever and the gage permitting any desired adjustment of the gage in a direction longitudinally of the insole without interfering with the vertical movements of the gage.

The working instrumentalities which operate directly upon the insole consist of two coöperating molds or forms shaped to engage opposite sides of the toe portion of the lip of the insole to set and shape the lip. Different shapes of molds will be used with different shapes of toes, Figs. 12 and 13 showing one pair of molds or forms adapted for use upon a comparatively narrow or pointed toe insole. Fig. 12, it will be noted, shows a double or duplex form, either end of which may be used upon the inner side of the lip according to the shape of the toe, the portion indicated at 45 being adapted for a somewhat broader and more rounding toe than the part 46. Form 47 illustrated in Fig. 13 is designed for use with form 45. In the machine of the drawings form 45, which for convenience will be called the inner form, is arranged not only to engage and to support the inner side of the lip, but also to press the insole firmly against the work support, while form 47, which will be called the outer form, imparts to the outer side of the lip a number of sharp blows to mold the lip.

The mechanism for imparting to the inner form its insole pressing movements comprises a vertically movable slide 47ª (see Fig. 6) to the lower end of which the inner form is secured, and cam-actuated devices connected to the upper end of the slide. A convenient method of mounting the form on the slide is that shown in the drawings where the form is provided with a dovetailed tongue 49 adapted to be received in the correspondingly shaped groove or recess 50 and to be secured therein by means of the clamping screw 51, the lower end of the slide being slotted as shown at 52 to provide sufficient yielding movement of the walls of the groove. Slide 47ª is freely movable vertically in a guideway formed in the slide block 53, being held therein by the plate 54, and is provided on each side of its upper end with the pivoted blocks 55 mounted in the slotted bifurcated end 56 of lever 57 pivoted upon the fixed stud 6. This lever is in turn actuated by bell crank lever 58 pivoted upon the stud 6, one end of which lever carries the cam roll 59 engaging the cam groove 60 in cam disk 61 fixed upon the main shaft of the machine. The other end of the bell crank lever is yieldingly connected to lever 57 by means of the rod 62 passing through the shoulder 63 upon lever 57 and pivotally connected by the stud 64 with the bifurcated end 65 of bell crank lever 58, a washer 66 being interposed between the shoulder and the bifurcated end of the bell crank lever. A spring 67 surrounding the rod 62 engages at one end the shoulder 63 and at the other the adjusting nut 68 held in place by the lock nut 69 normally holding the shoulder 63 in close contact with the washer 66, which in turn rests upon the bifurcated end 65 of the bell crank lever 58. This lever 57 tends normally to partake of the movements of lever 58 but yields when the inner form has clamped the insole against the work support. By varying the position of the adjusting nut 68 the degree of compression of spring 67 may be altered so that the insole may be clamped against the work support under a heavier or a lighter pressure as desired. Cam groove 60 is so shaped that the inner form will be moved toward the work support, in two steps or movements, the first movement bringing the form into light engagement with the surface of the insole, and the final movement causing the form to clamp the insole firmly against the work support preparatory to the molding operation.

In order to adapt the machine for operation upon insoles of different thicknesses, provision is made for adjusting the slide 47ª with its form nearer to or farther from the work support, and this is accomplished by an eccentric mounting of the pivotal supports for the blocks 55 carried on the upper end of the slide 48. As shown in Fig. 6, a circular aperture is provided in the upper end of this slide in which is mounted the cylindrical stud or bushing 70, the upper end of the slide being split as shown at 71 and provided with a clamping screw 72 so that the bushing 70 may be clamped in any desired radial position. Each end of the bushing 70 is provided with a screw-threaded hole, the axes of which are co-incident, but eccentric relatively to the axis of the bushing. In each of these holes is secured a screw 73 which constitutes the pivotal support for the block 55. By loosening the set screw 72 and turning the stud or bushing 70, the slide 48 with its form may be brought to the proper vertical adjustment for the thickness of the insole upon which the machine is to operate. Fig. 6 shows an adjustment for insoles of extreme thickness.

The inner form is given its horizontal or lip-engaging movement by means of the slide carrier 53 which is mounted to move horizontally in guide-ways 74 formed in the forward end of bracket 75 projecting upwardly and forwardly from the left-hand side of the frame of the machine. The means for actuating the slide carrier comprises the cam lever 76 pivoted at 77 and connected at its upper end by the link 78 with the rearwardly projecting arm 79 on the slide carrier. Cam lever 76 is provided near its upper end with the rearwardly projecting arm 80 which carries at its extremity the cam roll 81, and located in the cam groove 82 formed in the right-hand face of cam disk 61 (see Figs. 2 and 4.) For the purpose of adjusting the inner form horizontally and relatively to the outer form to provide for lips of varying thickness, the pin or stud 83 which connects link 78 with arm 79 is provided with an eccentric portion, the desired adjustment of the inner form being obtained by turning the pin or stud to the proper position and securing it there by its clamping nut 84.

The outer form 47, shown in Fig. 13, is secured to the upper end of the arm 85 of the bell crank lever pivoted upon the stud 86 fixed in the lower part of the frame of the machine. The means for securing this form in position comprises the dovetailed portion 87 at right angles to the body of the form, and received in a correspondingly-shaped recess 88 in the front face of the upper end of the arm 85. A clamping screw 89 normally holds the form securely in position. The form may be adjusted vertically with relation to the work support to provide for different thicknesses of feather on the insole by means of the adjusting screw 90 passing through the threaded aperture 91 in the rearwardly projecting arm or shoulder 92 of the form, the lock nut 93 securing the adjusting screw in position. The bell crank lever is provided with a rearwardly extending arm 94 and is actuated by the cam lever 95 pivotally mounted at one end upon the fixed stud 86 and carrying at its other end a cam roll 97 located in the cam groove 98, in the left-hand face of cam disk 99 (see Fig. 4.) The cam lever is connected with the arm 94 of the bell crank lever by means of the rod 100 pivoted at 101 upon the bell crank lever and passing freely through an aperture in the boss 102 on the end of the arm 94. A spring 103 surrounds the outer end of the rod 100 and engages at one end the boss 102 and at the other the adjusting nut 104 held in place by the lock nut 105. This construction provides a yielding connection between the levers 94 and 95 so that after the outer form has reached the limit of its inward movement against the lip of the insole, any further actuation of the cam lever will cause a compression of spring 103 without damage to the parts. By varying the compression of spring 103 the molding pressure exerted by the outer form 47 may be altered, a heavier or a lighter pressure being produced as may be desired. In order to provide for a positive movement of the outer form away from the lip of the insole, a stop screw 106 has been mounted in a boss 107 on the arm 94 of the bell crank lever, the end of the screw normally engaging with the contact piece 108 carried by the cam lever 95. The abutment screw may be adjusted by means of the milled head 109 and may be locked in any desired position by the lock nut 110.

The cam groove 98 for actuating the outer form is provided with three portions of diminishing radius, each of which portions, it is evident, will cause the cam lever to impart to the outer form a lip-engaging or molding movement, while the inner form supports the inner side of the lip and clamps the insole firmly against the work support. It is obvious from Fig. 9 that the toe gage 11 normally projects above the work support to such an extent that its upper end lies in the path of movement of the outer form. Accordingly it is arranged to be depressed upon each forward movement of the outer form by means of the inclined face 111 of the block 112 carried by the arm 85 of the bell crank lever, which engages the short arm 44 of the bell crank lever 39 and through the pin-and-slot connection depresses the gage 11 out of the path of the outer form. On the backward movement of the form the spring 38 returns the gage to its normal position.

In order to trim off any surplus material that may be present at the top of the lip, either as a result of the molding operation or otherwise, a trimming knife 113 has been provided which is pivotally mounted in the recess 114 of the outer form (see Figs. 9 and 13.) The cutting edge of the knife is shaped to correspond to the outer form and projects sufficiently beyond the operative surface thereof to trim away the surplus material from the top of the lip. A spring 115 (see Fig. 9) normally holds the knife depressed but permits its cutting edge to rise so that the top of the lip is free to move upwardly under the blows of the outer form, the knife on each succeeding forward movement of the form trimming off the excess of material beaten up by the last preceding blow.

The main shaft 4 of the machine is actuated by means of the constantly rotating driving pulley 120 mounted loosely upon said shaft and arranged to be connected thereto by clutch mechanism which is adapted to be thrown into operation by the operator after he has positioned the insole upon the work support, and out of operation by automatic mechanism after the shaft has completed a single revolution. The clutch mechanism which is shown in detail in Figs. 8, 14 and 15, is of the roll or "Horton" type, the roll or clutch member 121 being located between the hardened steel plate 122 set in the main shaft 4 and the bushing or sleeve 123 secured in the hub 124 of the driving pulley 120. A retainer 125 is mounted loosely upon the main shaft 4 and is provided with a hub 126 cut away at 127 to receive the roll or clutch member 121. When the parts are in the position shown in Fig. 15 the clutch is inoperative, and the driving pulley 120 will rotate freely while the main shaft 4 remains stationary. If, however, the retainer be turned slightly to the right in Fig. 15, the roll will be wedged between the plate 122 and the bushing 123, thereby connecting the driving pulley with the main shaft 4.

The means for rotating the retainer relatively to the shaft consist of the spring 128 (see Fig. 8), one end of which is secured to the screw 129 fixed in the retainer, while the other end is attached to the screw 130 in the brake member 131 which is pinned upon the shaft 4. The spring tends normally to rotate the retainer relatively to the shaft to render the roll operative to close the clutch, but such relative rotation is prevented and the clutch held open by means of stop mechanism which prevents forward rotation of the retainer, while a brake holds the shaft stationary. The stop mechanism comprises the projection 132 on the periphery of the retainer, said projection having a shoulder on its advancing face which is arranged to engage a stop pin 133, spring mounted in a recess in a lever 134 pivoted upon the fixed stud 135 projecting from the frame of the machine. The braking devices consist of the brake shoe 136 pivoted upon lever 134 and arranged to engage the braking surface on the periphery of brake member 131. The lever 134 is normally held in the position shown in Fig. 8 by the spring 137, one end of which is secured to a pin 138 depending from said lever, while the other is attached to a pin 139 on the tripping lever 140 shortly to be described, and while in this position the stop pin 133 engages the shoulder on the retainer and the brake shoe grips the brake member. Lever 134 is actuated to release the retainer 125 by means of the tripping lever 140, pivotally mounted at its lower end to an arm 141 fixed upon rock shaft 142 which is mounted in bearings in the lower portion of the frame of the machine. Tripping lever 140 is notched as at 143 to form a shoulder 144 arranged to engage a wear plate 145 secured to the bifurcated end of the horizontal arm 146 of lever 134. Rock shaft 142 is actuated in one direction through the arm 147 secured thereto, a connecting rod 148 and a treadle (not shown), and in the other direction by a spring 149, one end of which is attached to the arm 150 also secured to the rock shaft 142 and at the other end to a pin 151 in the column of the machine. When the treadle is depressed by the operator, the tripping lever 140 is also depressed and lever 134 turned about its pivot until stop pin 133 is carried out of engagement with shoulder 132 on the retainer, whereupon spring 128 is rendered operative, and the clutch thrown into action.

In order that the stopping mechanism may automatically return to its normal position to stop the retainer and thus disconnect the clutch after a single revolution of the main shaft irrespective of whether or not the operator releases the treadle, a knock-off block 152 has been secured to the projection 132 on the periphery of the retainer, and tripping lever 140 has been extended to bring its end 153 into the path of movement of the block. Immediately after the retainer starts to rotate the block 152 engages the end 153 of tripping lever 140 and forces the lever to the left as viewed in Fig. 8 to such an extent that shoulder 144 is carried out of engagement with plate 145, and lever 134 immediately swings back toward its normal position with stop pin 133 in the path of movement of the shoulder on the retainer ready to stop the retainer and to throw the clutch out of action as soon as a complete revolution has been effected. In order to prevent, however, the brake from being applied at this time, retainer 125 is formed with an eccentric portion or cam 154 which engages the end of lever 134 and prevents its complete return to its original position until shortly before the shoulder on the retainer reaches the stop pin 133.

The machine thus automatically stops after a single revolution of the main shaft, the tripping lever 140 returning to its normal position as soon as the treadle is released.

In order to render the clutch inoperative so that the machine may be turned over by hand, a screw 155 has been mounted in the retainer with its inner end in position normally out of engagement with the hub of the brake member, but arranged to be screwed down into engagement therewith.

The above-described machine is operated as follows: The side gages 10 are first adjusted by means of the hand wheel 25 for the width of insole to be operated upon, and the toe gage 11 is brought by the hand wheel 34 into proper position dependent upon the width of feather of the insole. Suitably shaped inner and outer forms for the particular shape of toe of the insole which is to be operated upon having been selected and secured in position in the machine, the inner form is adjusted vertically by means of the eccentric stud or bushing 70 according to the thickness of the body of the insole, and horizontally by means of the eccentric stud 83, according to the thickness of the lip. The machine is now ready for an insole, which is placed upon the work support with its opposite lateral edges in contact with the edge gages 10 and the edge of its toe portion pressed firmly against the toe gage 11. The operator by depressing the treadle throws the clutch mechanism into action and causes the main shaft to make a single revolution, after which the clutch is thrown out and the shaft brought to rest in its original starting position. During this revolution of the main shaft a complete cycle of operations of the machine has taken place. The inner form has first been brought down into relatively light contact with the upper surface of the insole, has next been moved along the surface of the insole in a direction toward the outer form to engage the inner side of the lip of the insole, and is finally given a further downward movement to clamp the insole firmly to the work support under relatively heavy pressure. While the insole is so held the outer form imparts three sharp blows to the outer side of the lip, not only setting the lip in the desired angular position with respect to the body of the insole, but also shaping it to the contour of the forms. Any surplus or excess of material at the top of the lip is trimmed off by the trimming knife 113 at each advancing movement of the outer form. The final portion of the revolution of the main shaft causes both inner and outer form to assume their original position ready to repeat their operations upon the next insole.

While it is obvious that the above-described machine may be employed for performing both of these operations of setting and shaping the lip of the insole, it is to be understood that the machine may be used to perform either alone, and where in the claims the phrase " to mold the lip ", or language of similar import, is employed, this is to be understood as covering either the setting operation or the shaping operation alone, as well as both together.

While the present invention has been described in connection with the specific form of machine shown in the drawings, it is not limited thereto, but may be embodied in widely varying forms of mechanism without departing from the spirit thereof.

Having thus described what is now considered the preferred form of the present invention, and explained the manner of using the same, what is claimed is:

1. A machine for operating upon insoles, having, in combination, a form having substantially the contour of the sole and engaging one side of a substantial length of the lip of an insole, means for engaging the other side of the lip to shape the lip substantially to the contour of the sole throughout the length of the form, and automatic mechanism for relatively actuating the form and the coöperating means while the latter clamps the sole in position, substantially as described.

2. A machine for operating upon insoles, having, in combination, coöperating forms for engaging the opposite sides of a substantial length of the lip of the insole to shape the lip to a predetermined contour, and automatic means for relatively actuating the forms to mold the lip while one of the forms is positioned in contact with the sole, substantially as described.

3. A machine for operating upon insoles having, in combination, a pair of coöperating forms shaped to impart a predetermined curvature to the toe portion of the lip while retaining the sole in a fixed position, and means for relatively actuating the forms parallel to the plane of the sole to mold the lip, substantially as described.

4. A machine for operating upon insoles, having, in combination, a support for the insole, a form for engaging the inner side of the toe portion of the lip and having a curvature corresponding to the contour of the sole, means for actuating the form, a second form for engaging the outer side of the toe portion of the lip, and automatic mechanism for actuating the second form while the first form engages the lip and holds the insole in a fixed position against the support, substantially as described.

5. A machine for operating upon insoles, having, in combination, a support for the insole, a form for engaging one side of the lip of the insole, and for pressing the insole against the support, means for actuating the form constructed and arranged to impart to the form an insole pressing movement both before and after a lip engaging movement, a second form for engaging the opposite side of the lip, and means for actuating the second form, substantially as described.

6. A machine for operating upon insoles, having, in combination, a support for the insole, an edge gage projecting through said support for positioning the insole thereon, means for operating upon the insole adjacent the gage, actuating devices therefor, and automatic mechanism for depressing the gage when said means are actuated, substantially as described.

7. A machine for operating upon insoles, having, in combination, a support for the insole, an edge gage for positioning the inside, means for engaging the outer side of the lip adjacent the edge gage, mechanism for actuating the said means, and connected mechanism operating automatically for moving the edge gage out of the path of movement of said means, substantially as described.

8. A machine for operating upon insoles, having, in combination, a support for the insole, a form movable into and out of engagement with the outer side of the lip, a form carrier, means to actuate the carrier, an edge gage projecting through the support for positioning the insole on the support, and mechanism actuated by the carrier for raising and lowering the gage in timed relation to the movements of the form, substantially as described.

9. A machine for operating upon insoles, having, in combination, a support for the insole, a toe edge gage projecting through the support, a movable slide in which the gage is mounted, devices for moving the slide to adjust the gage, means for operating upon the insole adjacent the gage, a carrier for said means, actuating mechanism for the carrier, an inclined surface on the carrier, a pivoted bell crank lever one arm of which is arranged to be engaged by the inclined surface, and a slotted connection between the other arm and the gage, substantially as described.

10. A machine for operating upon insoles, having, in combination, a support for the insole, a pair of forms for engaging opposite sides of the lip of the insole to shape the lip to a predetermined contour, means for relatively actuating the forms to mold the lip, and means for adjusting the forms relatively to each other in two directions to accommodate varying classes of insoles, substantially as described.

11. A machine for operating upon insoles, having, in combination, a support for the insole, means engaging the body of the insole inside the lip to clamp the insole to the support and also engaging the inner side of the lip to support the lip during the trimming operation, a trimming knife on the opposite side of the lip and movable toward said means to trim a substantial length of the lip, and actuating mechanism for the knife, substantially as described.

12. A machine for operating upon insoles, having, in combination, means engaging the side of the toe portion of the lip of the insole to support the lip during the trimming operation, a trimming knife of a width not less than the length of the lip engaged by the support, and means for actuating the knife, substantially as described.

13. A machine for operating upon insoles, having, in combination, means for engaging the inner side of the toe portion of the lip to support the lip during the trimming operation, a U-shaped trimming knife, and means for actuating the knife to trim the toe portion of the lip, substantially as described.

14. A machine for operating upon insoles, having, in combination, a support for the insole, forms for engaging opposite sides of the lip of the insole, one of said forms supporting the lip during the trimming operation, a trimming knife and means for relatively actuating the forms and knife to mold the lip to a predetermined contour and to trim the projecting margin of the lip, substantially as described.

15. A machine for operating upon insoles, having, in combination, a support for the insole, forms for engaging opposite sides of the lip of the insole, a knife carried by one of said forms for trimming the top of the lip, and means for relatively actuating the lip, and means for relatively actuating the forms to mold and to trim the lip of the insole, substantially as described.

16. A machine for operating upon insoles, having, in combination, a support for the insole, forms for engaging opposite sides of the lip of the insole, means for holding one of said forms stationary, means for actuating the other of said forms to mold the lip against the stationary form, and a pivoted knife carried by the movable form for trimming the lip, substantially as described.

17. A machine for operating upon insoles, having, in combination, a support for the insole, a form for pressing the insole against the support and for engaging one side of the lip, a slide for supporting the form, a slide carrier, yielding means for actuating the slide to move the form toward and from the support, means for actuating the slide carrier to impart to the form its lip engaging movement, a second form to engage the other side of the lip, and yielding means for actuating the second form, substantially as described.

18. A machine for operating upon insoles, having, in combination, coöperating forms for engaging the inner and outer sides of the lip to mold the same, and mechanism for actuating the forms including a slide for one of the forms, a slide carrier provided with a guideway for the slide, a fixed support provided with a guideway for the carrier transverse to the guideway for the slide, a pivoted lever for actuating the slide, a slotted connection between the lever and the slide, and means for moving the slide carrier, substantially as described.

19. A machine for operating upon insoles, having, in combination, coöperating forms for engaging opposite sides of a substantial length of the lip of the insole, means for holding one of said forms in engagement with the lip, and automatic mechanism for actuating the other form to mold the lip, substantially as described.

20. A machine for operating upon insoles, having, in combination, coöperating forms for engaging opposite sides of a substantial length of the lip of the insole, and yielding means for relatively actuating the forms to mold the lip, substantially as described.

21. A machine for operating upon insoles, having, in combination, a support for the insole, devices for positioning the insole upon the support, an inner form for supporting the inner side of the lip in predetermined position, an outer form for engaging the opposite side of the lip, and mechanism for actuating the outer form to mold the lip against the inner form, substantially as described.

22. A machine for operating upon insoles, having, in combination, a support for the insole, devices for locating the insole in predetermined position thereon, a form for clamping the insole in the predetermined position and for engaging one side of the lip, a second form for engaging the opposite side of the lip, and mechanism for actuating the second form to mold the lip, substantially as described.

23. A machine for operating upon insoles having, in combination, a support for the insole, means for molding the lip of the insole to a predetermined contour, and devices engaging the edge of the insole while on the support to position the insole in proper relation to the molding means, substantially as described.

24. A machine for operating upon insoles having, in combination, a pair of coöperating forms, means for relatively actuating the forms to mold the lip to a predetermined contour, and a knife arranged to trim the upstanding portion of the lip above a certain height while the lip is supported by one of the forms, substantially as described.

JOHN B. HADAWAY.

Witnesses:
ANNIE C. RICHARDSON,
WARREN G. OGDEN.